(12) United States Patent
Mao et al.

(10) Patent No.: US 11,317,496 B2
(45) Date of Patent: Apr. 26, 2022

(54) LED LAMP CIRCUIT

(71) Applicant: CURRENT LIGHTING SOLUTIONS, LLC, East Cleveland, OH (US)

(72) Inventors: Zhu Mao, Shanghai (CN); Qi Long, Shanghai (CN); Min Fang, Shanghai (CN); Shuyi Qin, Shanghai (CN); Bo Zhang, Shanghai (CN); Fanbin Wang, Shanghai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/495,960

(22) PCT Filed: May 21, 2018

(86) PCT No.: PCT/US2018/033621
§ 371 (c)(1),
(2) Date: Sep. 20, 2019

(87) PCT Pub. No.: WO2018/217609
PCT Pub. Date: Nov. 29, 2018

(65) Prior Publication Data
US 2020/0137854 A1  Apr. 30, 2020

(30) Foreign Application Priority Data
May 25, 2017 (CN) .......................... 201710378151.4

(51) Int. Cl.
*H05B 45/56* (2020.01)
*H01C 7/02* (2006.01)
(Continued)

(52) U.S. Cl.
CPC ............. *H05B 45/56* (2020.01); *H05B 45/18* (2020.01); *H01C 7/02* (2013.01); *H01C 7/04* (2013.01)

(58) Field of Classification Search
CPC ........ H05B 45/56; H05B 45/18; H05B 45/02; H01C 7/02; H01C 7/04; H02J 7/345;
(Continued)

(56) References Cited

U.S. PATENT DOCUMENTS 3,187,576 A * 6/1965 Beeston, Jr. ............. G01K 7/25
374/165
3,623,367 A * 11/1971 Benedict ................ G01K 13/02
73/300

(Continued)

FOREIGN PATENT DOCUMENTS

CN         2643538 Y  *  9/2004
CN       203840609 U     9/2014
(Continued)

OTHER PUBLICATIONS

Chinese Office Action dated Aug. 19, 2019 which was issued in connection with CN201710378151.4 which was filed on May 25, 2017.
(Continued)

*Primary Examiner* — Abdullah A Riyami
*Assistant Examiner* — Syed M Kaiser
(74) *Attorney, Agent, or Firm* — Buckley, Maschoff & Talwalkar LLC

(57) ABSTRACT

Provided is an LED lamp circuit, comprising an LED luminous component circuit, a rectifier circuit, and an output control circuit coupled between the LED luminous component circuit and the rectifier circuit. The LED luminous component circuit comprises at least one light-emitting diode. The rectifier circuit is configured to output a rectified
(Continued)

voltage to the LED luminous component circuit. The output control circuit comprises a voltage regulator circuit and a control switch circuit. The voltage regulator circuit comprises a thermosensitive device and a voltage divider connected in series. The thermosensitive device can regulate the control voltage at both ends of the control switch circuit. To protect the LED lamp, the control switch circuit disconnects when the control voltage is less than the threshold voltage of the control switch circuit.

11 Claims, 4 Drawing Sheets

(51) Int. Cl.
*H05B 45/18* (2020.01)
*H01C 7/04* (2006.01)
(58) Field of Classification Search
CPC ...... G01R 19/0084; H02H 5/042; G01K 7/02; G01K 7/16; G01K 7/22
USPC .................................................. 361/11, 106
See application file for complete search history.

(56) References Cited

U.S. PATENT DOCUMENTS

| | | | | |
|---|---|---|---|---|
| 3,777,234 | A * | 12/1973 | Luger | H02P 7/2885 388/822 |
| 4,301,407 | A * | 11/1981 | Koslar | G01R 13/405 324/96 |
| 5,354,965 | A * | 10/1994 | Lee | B60S 1/488 15/250.05 |
| 6,111,739 | A | 8/2000 | Wu et al. | |
| 8,330,381 | B2 | 12/2012 | Langovsky | |
| 8,896,235 | B1 * | 11/2014 | Shum | H05B 45/48 315/309 |
| 9,243,757 | B2 | 1/2016 | Barnetson et al. | |
| 2007/0040696 | A1 * | 2/2007 | Mubaslat | H05B 45/18 340/657 |
| 2008/0130288 | A1 * | 6/2008 | Catalano | H05B 45/18 362/294 |
| 2009/0100924 | A1 * | 4/2009 | Zimmermann | G01F 1/6845 73/204.19 |
| 2010/0039794 | A1 | 2/2010 | Ghanem et al. | |
| 2011/0298374 | A1 * | 12/2011 | Lenk | H05B 45/37 315/50 |
| 2011/0304201 | A1 * | 12/2011 | Sun | B60R 16/03 307/10.1 |
| 2012/0038289 | A1 | 2/2012 | Jee et al. | |
| 2013/0141004 | A1 * | 6/2013 | Wu | H05B 47/10 315/247 |
| 2015/0208470 | A1 | 7/2015 | Tsai | |
| 2015/0382420 | A1 * | 12/2015 | Sakai | H05B 45/44 315/193 |
| 2016/0172898 | A1 * | 6/2016 | Willemin | H02J 7/345 320/101 |
| 2016/0226393 | A1 * | 8/2016 | Haas | H05B 45/37 |
| 2017/0184840 | A1 * | 6/2017 | Yin | G02B 26/02 |
| 2018/0183315 | A1 * | 6/2018 | Lin | H05B 47/18 |
| 2018/0301073 | A1 * | 10/2018 | Fei | G09G 3/16 |

FOREIGN PATENT DOCUMENTS

| | | |
|---|---|---|
| CN | 104545479 A | 4/2015 |
| JP | 2015215214 A * | 12/2015 |
| WO | 15066566 A1 | 5/2015 |

OTHER PUBLICATIONS

International Search Report and Written Opinion dated Nov. 15, 2018 which was issued in connection with PCT/US18/33621 which was filed on May 21, 2018.

* cited by examiner

LED LAMP CIRCUIT

TECHNICAL FIELD

The present invention relates to the field of LED lighting, relating in particular to an LED circuit.

BACKGROUND

LED lighting has seen rapid growth in recent years owing to its energy efficiency, long service life, compact size, and environmental friendly advantages. LED lighting is increasingly being used as a replacement for fluorescent lighting.

In a tube-type fluorescent lamp, the original electronic ballast is used as an LED lamp driver. In the process of restructuring a lamp, it is not necessary to configure a dedicated LED driver, which saves on manpower. This is especially beneficial in countries and regions where labor is expensive. These days, there are many LED lamps on the market that are shaped like fluorescent tubes. Some can be adapted only to specific types of electronic ballasts, some can be adapted to numerous types of electronic ballasts, and some are compatible with electronic ballasts or LED lamps powered by AC grid voltages.

Hundreds of patented technologies are available with respect to the various aforementioned applications. One early technology mainly focuses on how to convert the high-frequency output of an electronic ballast to the DC drive current required by an LED when there is absolutely no other protective measure. The operating characteristics of a fluorescent lamp are different from those of an LED lamp. Upon activation, an electronic ballast must be in a light load state before a stable working state can be established. When an LED is used as the load of the electronic ballast, a relatively large working current may appear in the electronic ballast at the moment of its activation. Consequently, the electronic ballast may mistakenly assume that the load is short-circuited and enter a protective state, such that the lamp does not light up.

When an electronic ballast is used to drive a fluorescent lamp, a protective circuit inside the electronic ballast protects the electronic ballast only from being burned when an arc occurs. When an electronic ballast is used to drive an LED lamp, an instantaneous surge current generated by the arc damages the LED lamp beads. Events in which LED beads are burned by arcs occur frequently.

One way of preventing arcs is to use a resettable fuse that protects against over-temperature. When a severe arc occurs and the temperature of the lamp head becomes high, the resettable fuse is disconnected and the arc is stopped. This passive form of anti-arc protection only works when the arc is severe. It has therefore been necessary to develop a new technology that prevent arcs in LED lamps. If an arc occurs between the pin and base of an LED lamp while the lamp is being operated, or if an arc occurs because the connectors inside the lamp tube are not connected well, the new technology can prevent damage to the LED lamp beads.

SUMMARY

Provided is an LED lamp circuit, comprising an LED luminous component circuit, a rectifier circuit, and an output control circuit coupled between the LED luminous component circuit and the rectifier circuit. The LED luminous component circuit comprises at least one light-emitting diode. The rectifier circuit is configured to output a rectified voltage to the LED luminous component circuit. The output control circuit comprises a voltage regulator circuit and a control switch circuit. The voltage regulator circuit comprises a thermosensitive device and a voltage divider connected in series. The thermosensitive device can regulate the control voltage at both ends of the control switch circuit. To protect the LED lamp, the control switch circuit disconnects when the control voltage is less than the threshold voltage of the control switch circuit.

BRIEF DESCRIPTION OF THE DRAWINGS

These and other features, aspects, and advantages of the present invention will become clearer once the following detailed description has been read with reference to the accompanying drawings, wherein like reference numerals refer to like parts throughout the drawings, where.

DETAILED DESCRIPTION

Unless otherwise defined, the technical and scientific terms used in the claims and specification are to be understood as they are usually by those skilled in the art to which the present invention pertains. "First", "second", and similar words used herein do not denote any order, quantity, or importance, but are merely intended to distinguish between different constituents. The terms "one", "a", and similar words are not meant to indicate a limit on quantity, but rather denote the presence of at least one. The approximate language used herein can be used for quantitative expressions, indicating that there is a certain amount of variation that can be allowed without changing the basic functions. Thus, numerical values that are corrected by language such as "approximately" or "about" are not limited to the exact value itself. Similarly, the terms "one", "a", and similar words are not meant to indicate a limit on quantity, but rather denote the presence of at least one. "Comprising", "including", and similar words indicate that the elements or articles preceding "comprising" or "consisting" encompass the elements or articles and all equivalent elements that follow "comprising" or "consisting", without excluding any other elements or articles. "Connected", "connection", "coupled", and similar words are not limited to a physical or mechanical connection, but may include direct or indirect electrical connections, thermal connections, thermally conductive connections, and thermally transmissive connections.

Figure 1:
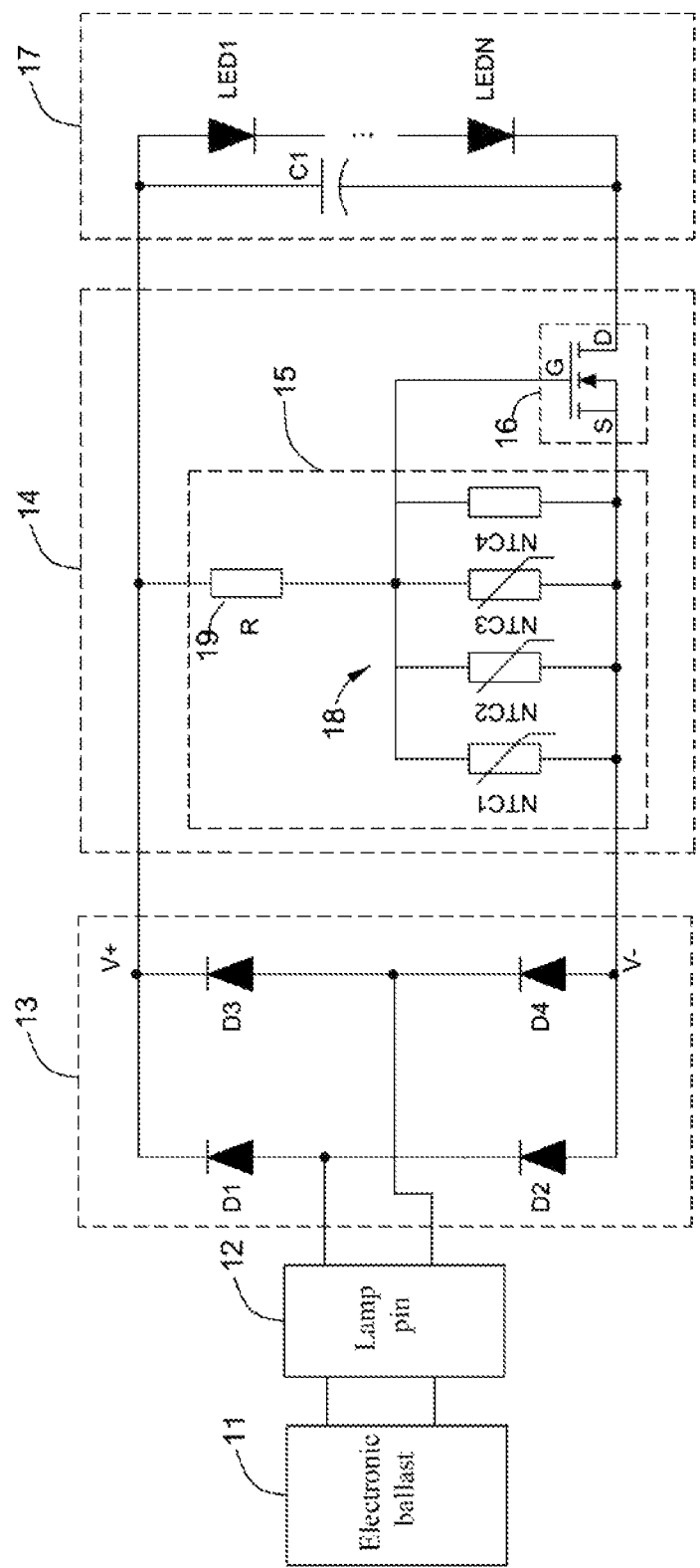
FIG. 1 is a schematic circuit diagram of the first embodiment of the LED lamp circuit according to the present invention.

The present invention relates to an LED lamp circuit driven by an electronic ballast. FIG. 1 shows the first embodiment of the present invention, which comprises an electronic ballast 11 for driving an LED lamp, four lamp pins 12 connected to the electronic ballast 11, a high-frequency rectifier circuit 13 and LED luminous component circuit 17 connected to the four lamp pins 12, and an output control circuit 14 coupled between the high-frequency rectifier circuit 13 and the LED luminous component circuit 17.

The high-frequency rectifier circuit 13 is a full-wave bridge rectifier circuit, comprising four rectifier diodes D1, D2, D3, and D4. The high-frequency rectifier circuit 13 is configured to regulate the voltage of the LED luminous component circuit 17, convert the high-frequency alternating current output from the electronic ballast 11 into a direct current, and output the regulated voltage and current required by both ends V+ and V− to drive the LED luminous component circuit 17.

The output control circuit 14 comprises a voltage regulator circuit 15 connected in parallel with the high-frequency rectifier circuit 13, and a control switch circuit 16 coupled between the voltage regulator circuit 15 and the LED luminous component circuit 17. The voltage regulator circuit 15 comprises a thermosensitive device 18 and a voltage divider 19 connected in series. The thermosensitive device 18 can regulate the control voltage at both ends of the control switch circuit 16. To protect the LED lamp, the control switch circuit 16 disconnects when the control voltage is less than the threshold voltage of the control switch circuit 16. In some embodiments of the present invention, the thermosensitive device 18 may comprise at least one negative temperature coefficient thermistor or at least one positive temperature coefficient thermistor. The voltage divider 19 comprises a voltage dividing resistor, a voltage regulator tube, or other voltage-regulating device that can perform voltage division. In the first embodiment shown in FIG. 1, the thermosensitive device 18 comprises four negative temperature coefficient thermistors NTC1, NTC2, NTC3, and NTC4 (hereinafter NTC) respectively coupled to the four lamp pins 12 of the LED lamp. The voltage divider 19 comprises a voltage dividing resistor R. The four negative temperature coefficient thermistors NTC are connected in parallel to form the thermosensitive device 18. One end of the thermosensitive device 18 is connected in series with the voltage divider 19, while the other end is connected to the DC output voltage V− end of the high-frequency rectifier circuit 13. The other end of the voltage divider 19 is connected to the DC output voltage V+ end of the high-frequency rectifier circuit 13.

The control switch circuit 16 comprises a field-effect transistor switching tube, which is connected in parallel with the thermosensitive device 18 (negative temperature coefficient thermistors NTC). The field-effect transistor switching tube comprises a gate G, a source S, and a drain D. The source S of the field-effect transistor switching tube is connected to one end of the thermosensitive device 18, and the gate G of the field-effect transistor switching tube is connected to the other end of the thermosensitive device 18, or in other words, connected between the thermosensitive device 18 and the voltage divider 19. The drain D of the field-effect transistor switching tube Q is connected to the LED luminous component circuit 17. The number of negative temperature coefficient thermistors NTC connected in parallel depends on the number of LED lamp pins. Generally, the number of LED lamp pins is the same as the number of negative temperature coefficient thermistors NTC connected in parallel. In the embodiment shown in FIG. 1, the LED lamp has four lamp pins 12. As such, the LED lamp circuit comprises four negative temperature coefficient thermistors NTC connected in parallel and respectively coupled to the four lamp pins 12. In some embodiments, the LED lamp may also comprise two lamp pins. The LED lamp circuit comprises two negative temperature coefficient thermistors connected in parallel and respectively coupled to the two lamp pins.

The LED luminous component circuit 17 comprises a light-emitting diode component, which comprises a plurality of light-emitting diodes LED1 to LEDN connected in series. The LED luminous component circuit 17 further comprises a filter capacitor C connected in parallel with the light-emitting diode component. One end (the anode) of the filter capacitor C is connected to one end of the voltage divider 19, and the two are then connected to the V+ output end of the high-frequency rectifier circuit 3. The other end (the cathode) of the filter capacitor C is connected to the drain D of the field-effect transistor switching tube Q. The anode of the light-emitting diode component is connected to the anode of the filter capacitor C. The cathode of the light-emitting diode component is connected to the cathode of the filter capacitor C, and the two are then connected to the drain D of the field-effect transistor switching tube Q. The filter capacitor C can reduce the ripple current of the light-emitting diodes LED1 to LEDN, so as to provider a better light-emitting effect.

Figure 2:
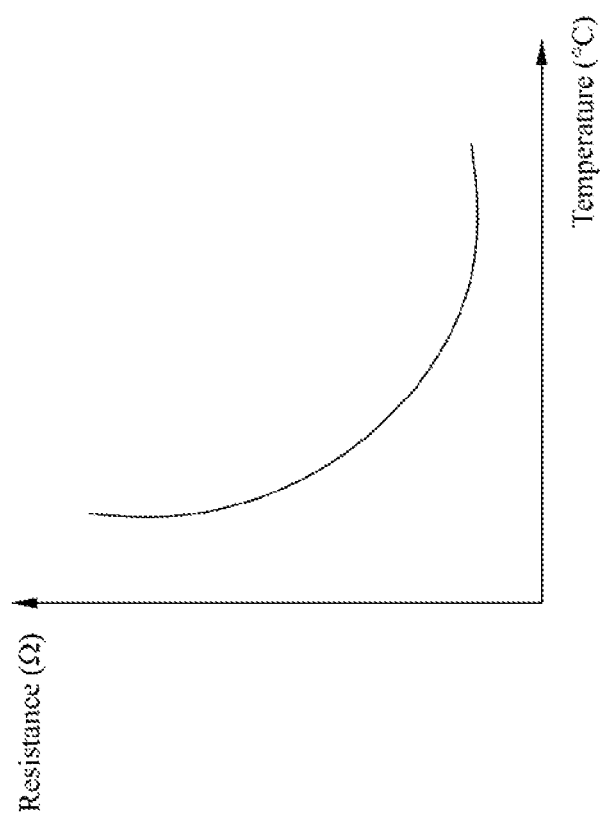
FIG. 2 is a schematic diagram of the change in resistance of a negative temperature coefficient thermistor with temperature in the first embodiment of the present invention.

According to FIG. 2, a resistance value of the thermosensitive device 18 decreases as the temperature rises, whereas the resistance value increases as the temperature decreases. The control voltage of the field-effect transistor switching tube Q is obtained according to the following formula:

$$V_{GS}=V_{LED}/(1+R/(R_{NTC1}//\ldots //R_{NTCN}))$$

When the electronic ballast 11 starts normal operations, the resistance value of the thermosensitive device 18 is very large. According to the above formula, the control voltage $V_{GS}$ of the field-effect transistor switching tube Q is sufficient. The field-effect transistor switching tube Q will be turned on, and the light-emitting diodes LED1 to LEDN will light up and work normally. If an arc occurs in the LED lamp, the temperature of the LED lamp pins increases, the resistance values of the negative temperature coefficient thermistors NTC decrease, and the resistance value of the thermosensitive device 18, that is, $R_{parallel}=R_{NTC1}//R_{NTC2}//R_{NTC3}//R_{NTC4}$ also decreases. According to the above formula $V_{GS}=V_{LED}/(1+R/(R_{NTC1}//\ldots //R_{NTCN}))$ of the control voltage of the field-effect transistor switching tube Q, the control voltage $V_{GS}$ decreases accordingly. When the control voltage $V_{GS}$ is less than the turn-on threshold voltage of the field-effect transistor switching tube, the field-effect transistor switching tube is turned off, and the entire circuit is disconnected. No current flows through the entire circuit, thereby eliminating the arc and protecting the LED lamp.

Figure 3:
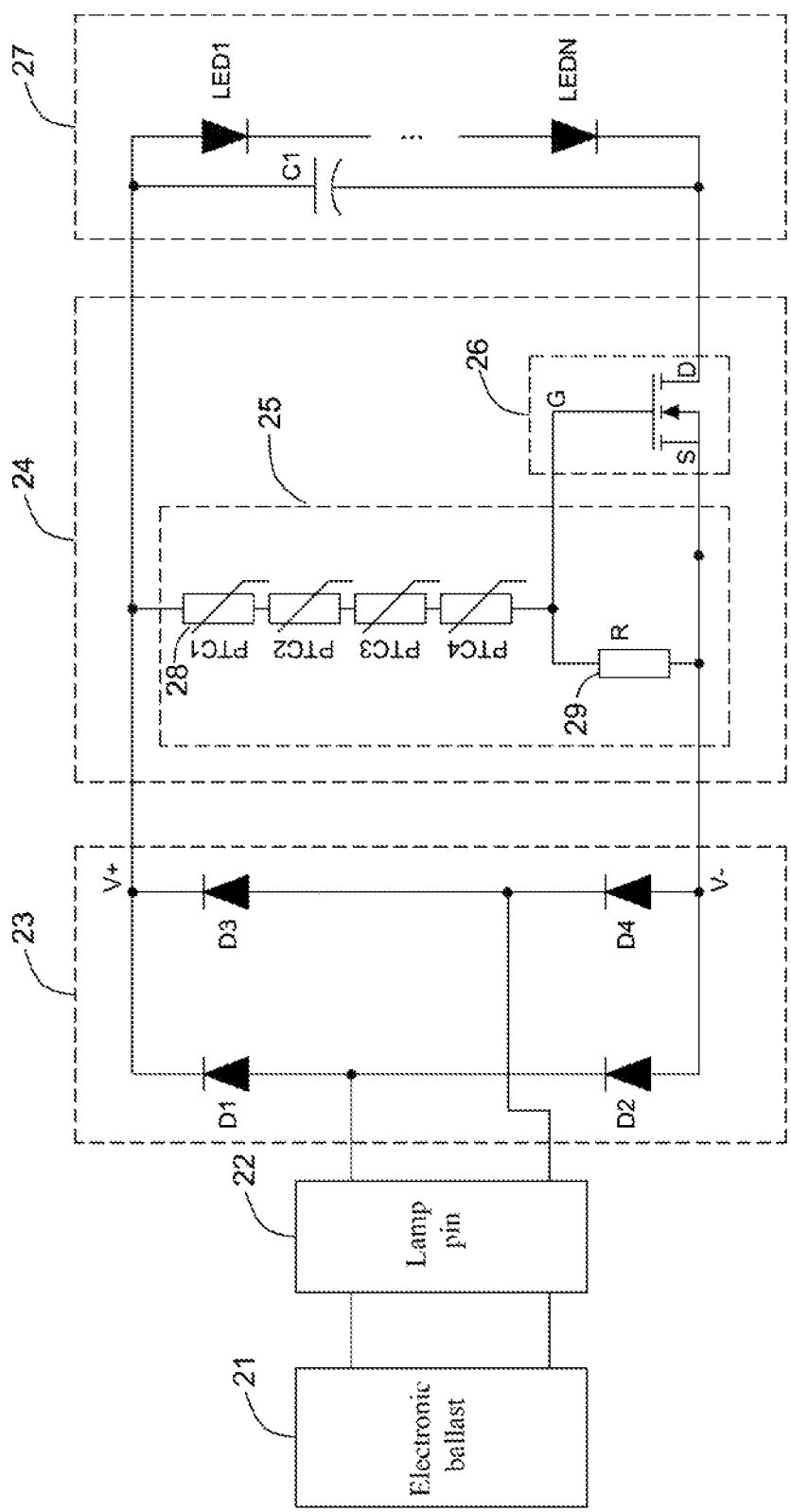
FIG. 3 is a schematic circuit diagram of the second embodiment of the LED lamp circuit according to the present invention.

FIG. 3 shows an LED lamp circuit driven by an electronic ballast according to another embodiment of the present invention, which also comprises an electronic ballast 21 for driving an LED lamp, four lamp pins 22 connected to the electronic ballast 21, a high-frequency rectifier circuit 23 and an LED luminous component circuit 27 connected to the four lamp pins 22, and an output control circuit 24 coupled between the high-frequency rectifier circuit 23 and the LED luminous component circuit 27. The output control circuit 24 comprises a voltage regulator circuit 25 and a control switch circuit 26. The voltage regulator circuit 25 and the high-frequency rectifier circuit 23 are connected in parallel. The voltage regulator circuit 25 comprises a thermosensitive device 28 and a voltage divider 29 connected in series. In some embodiments, the thermosensitive device 28 may comprise at least one positive temperature coefficient thermistor. The voltage divider 29 comprises a voltage dividing resistor, a voltage regulator tube, or other voltage-regulating device that can perform voltage division.

In contrast to the first embodiment, in the second embodiment shown in FIG. 3, the thermosensitive device 28 comprises four positive temperature coefficient thermistors PTC1, PTC2, PTC3, and PTC4 (hereinafter PTC) connected in series. The four positive temperature coefficient thermistors PTC are connected in series to form the thermosensitive device 28. One end of the thermosensitive device 28 is connected to the voltage divider 29, and the other end is connected to the DC output voltage V+ end of the high-frequency rectifier circuit 23. The other end of the voltage divider 29 is connected to the V− output end of the high-frequency rectifier circuit 23.

The control switch circuit 26 comprises a field-effect transistor switching tube, which is connected in series with the thermosensitive device 28 (which comprises the four positive temperature coefficient thermistors PTC that are connected in series). The field-effect transistor switching tube comprises a gate G, a source S, and a drain D. The gate G of the field-effect transistor switching tube is connected to one end of the voltage divider 29, or in other words, connected between the voltage divider 29 and the thermosensitive device 28. The source S of the field-effect transistor switching tube is connected to the other end of the voltage divider 29. The drain D of the field-effect transistor switching tube is connected to the LED luminous component circuit 7. The number of positive temperature coefficient thermistors PTC connected in series depends on the number of LED lamp pins. Generally, the number of LED lamp pins is the same as the number of positive temperature coefficient thermistors PTC connected in series. In the embodiment shown in FIG. 3, the LED lamp has four lamp pins 22. As such, the LED lamp circuit comprises four positive temperature coefficient thermistors connected in series PTC and respectively coupled to the four lamp pins 22. In some embodiments, the LED lamp may also comprise two lamp pins. The LED lamp circuit comprises two positive temperature coefficient thermistors connected in series and respectively coupled to the two lamp pins.

Figure 4:
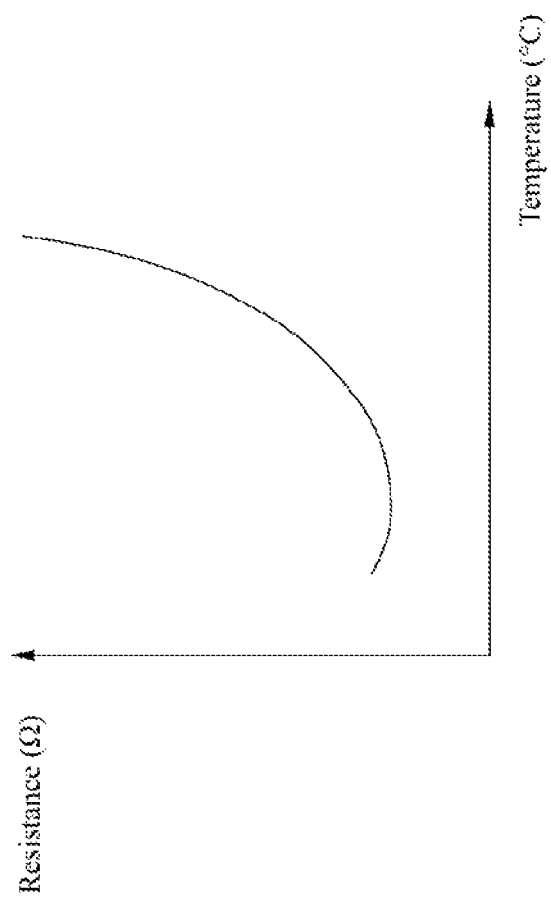
FIG. 4 is a schematic diagram of the change in resistance of a positive temperature coefficient thermistor with temperature in the second embodiment of the present invention.

According to FIG. 4, a resistance value of the thermosensitive device 28 increases as the temperature rises, and the resistance value decreases as the temperature decreases. The control voltage of the field-effect transistor switching tube Q is obtained according to the following formula:

$$V_{GS} = V_{LED}/(1 + (R_{PTC1} + \ldots + R_{PTC4})/R)$$

When the electronic ballast 21 starts normal operations, the resistance value of the thermosensitive device 28 (which comprises the positive temperature coefficient thermistors PTC connected in series) is very small. According to the above formula, the control voltage $V_{GS}$ of the field-effect transistor switching tube Q is sufficient. The field-effect transistor switching tube Q will be turned on, and the light-emitting diodes LED1 to LEDN will light up and work normally. If an arc occurs in the LED lamp, the temperature of the LED lamp pins increases, the resistance values of the positive temperature coefficient thermistors PTC increase, and the resistance value of the thermosensitive device 28, that is, $R_{series} = R_{PTC1} + R_{PTC2} + R_{PTC3} + R_{PTC4}$ also increases. According to the above formula $V_{GS} = V_{LED}/(1 + (R_{PTC1} + \ldots + R_{PTC4})/R)$ of the control voltage of the field-effect transistor switching tube Q, the control voltage $V_{GS}$ decreases accordingly. When the control voltage $V_{GS}$ is less than the turn-on threshold voltage of the field-effect transistor switching tube Q, the field-effect transistor switching tube Q is turned off, and the entire circuit is disconnected. No current flows through the entire circuit, thereby eliminating the arc and protecting the LED lamp.

The description uses specific embodiments to describe the present invention, including the best mode, and can help any person skilled in the art perform experimental operations. These operations include using any device and system and using any specific method. The patentable scope of the present invention is defined by the claims, and may include other examples that occur in the art. Other examples are considered to be within the scope of the claims of the invention if they are not structurally different from the literal language of the claims or they have equivalent structures as described in the claims.

The invention claimed is:

1. A LED lamp circuit comprising:
an LED luminous component circuit comprising at least one LED;
a rectifying circuit configured to produce a rectified voltage output to the LED luminous component circuit;
an output control circuit coupled between the LED luminous component circuit and the rectifying circuit, the output control circuit comprising a voltage regulation circuit and a control switch, the voltage regulator circuit being connected in parallel with the rectifying circuit, the voltage regulator circuit being separate from the control switch, the voltage regulation circuit comprising a thermosensitive component and a voltage dividing component connected in series, the thermosensitive component configured to regulate a control voltage of the control switch, and wherein the control switch disconnects when the control voltage is lower than a threshold voltage of the control switch, the thermosensitive component comprising a plurality of thermistors connected in parallel, each thermistor of the plurality of thermistors having respective first and second ends, the respective first ends of each of the plurality of thermistors being coupled to the voltage dividing component and the respective second ends of each of the plurality of thermistors being coupled to the rectifying circuit.

2. The LED lamp circuit of claim 1, wherein the control switch is coupled between the voltage regulator circuit and the LED luminous component circuit.

3. The LED lamp circuit of claim 1, wherein a total number of pins of the lamp circuit is equal to a total number of thermistors of the plurality of thermistors.

4. The LED lamp circuit of claim 1, wherein the voltage dividing component comprises a voltage dividing resistor.

5. The LED lamp circuit of claim 1, wherein the voltage dividing component comprises a voltage regulation tube.

6. The LED lamp circuit of claim 1, wherein the control switch comprises a field-effect transistor, the field-effect transistor comprises a gate, a source and a drain, and the gate of the field-effect transistor is coupled between the thermosensitive component and the voltage dividing component.

7. The LED lamp circuit of claim 6, wherein the plurality of thermistors comprises at least one negative temperature coefficient thermistor, the source of the field-effect transistor is coupled to one end of the at least one negative temperature coefficient thermistor, the gate of the field-effect transistor is coupled between the at least one negative temperature coefficient thermistor and the voltage dividing component, the drain of the field-effect transistor is coupled to the LED luminous component circuit.

8. The LED lamp circuit of claim 7, wherein the at least one negative temperature coefficient thermistor comprises four negative temperature coefficient thermistors connected in parallel.

9. The LED lamp circuit of claim 6, wherein the rectifying circuit receives input voltage via at least two input pins and the plurality of thermistors comprises a positive temperature coefficient thermistor associated with each of the input pins, each thermistor connected in parallel, the source of the field-effect transistor is coupled to one end of the voltage dividing component, the gate of the field-effect transistor is coupled between the voltage dividing component and the at least one positive temperature coefficient thermistor, the drain of the field-effect transistor is coupled to the LED luminous component circuit.

10. The LED lamp circuit of claim 9, wherein the at least one positive temperature coefficient thermistor comprises four positive temperature coefficient thermistors connected in series.

11. A lamp, comprising:
   at least two input pins electrically coupled to a ballast;
   a rectifying circuit electrically coupled to the at least two input pins and configured to produce a rectified voltage output to a light emitting diode (LED) component;
   an output control circuit coupled between the LED component and the rectifying circuit, the output control circuit comprising a voltage regulation circuit and a control switch, the voltage regulator circuit being connected in parallel with the rectifying circuit, the voltage regulator circuit being separate from the control switch, the voltage regulation circuit comprising a thermosensitive component including a plurality of thermistors connected in parallel and being associated with each of the at least two input pins, each thermistor connected in parallel, and a voltage dividing component connected in series, the thermosensitive component configured to regulate a control voltage of the control switch, and wherein the control switch disconnects when the control voltage is lower than a threshold voltage of the control switch, each thermistor of the plurality of thermistors having respective first and second ends, the respective first ends of each of the plurality of thermistors being coupled to the voltage dividing component and the respective second ends of each of the plurality of thermistors being coupled to the rectifying circuit.

* * * * *